US012410787B2

(12) United States Patent
Zhong et al.

(10) Patent No.: US 12,410,787 B2
(45) Date of Patent: Sep. 9, 2025

(54) AIR PUMP HAVING REMINDING FUNCTION

(71) Applicant: KITCHENDAO KITCHENWARE CO., LTD, Guangdong (CN)

(72) Inventors: Jiajie Zhong, Guangdong (CN); Haisheng Chen, Guangdong (CN); Jing Huang, Guangdong (CN)

(73) Assignee: KITCHENDAO KITCHENWARE CO., LTD, Guangdong (CN)

( * ) Notice: Subject to any disclaimer, the term of this patent is extended or adjusted under 35 U.S.C. 154(b) by 0 days.

(21) Appl. No.: 18/744,463

(22) Filed: Jun. 14, 2024

(65) Prior Publication Data

US 2024/0418163 A1 Dec. 19, 2024

(30) Foreign Application Priority Data

Jun. 16, 2023 (CN) ......................... 202321550887.2

(51) Int. Cl.
*F04B 53/00* (2006.01)
*F04B 51/00* (2006.01)
*G08B 21/24* (2006.01)

(52) U.S. Cl.
CPC ............. *F04B 53/00* (2013.01); *F04B 51/00* (2013.01); *G08B 21/24* (2013.01)

(58) Field of Classification Search
CPC .......... F04B 33/00; F04B 37/10; F04B 37/14; F04B 53/00; F04B 51/00; G08B 21/24; G01N 1/24; G01N 2001/247
See application file for complete search history.

(56) References Cited

U.S. PATENT DOCUMENTS

| | | | | |
|---|---|---|---|---|
| 4,975,028 A * | 12/1990 | Schultz | F04B 39/1073 | |
| | | | 417/511 | |
| 9,452,875 B2 * | 9/2016 | Jepson | G06F 16/00 | |
| 2004/0200863 A1 * | 10/2004 | Van De Braak | B65B 31/047 | |
| | | | 222/383.1 | |
| 2009/0166490 A1 * | 7/2009 | Liao | F16B 47/00 | |
| | | | 248/205.8 | |

* cited by examiner

*Primary Examiner* — Loren C Edwards
(74) *Attorney, Agent, or Firm* — The Sun IP Law

(57) ABSTRACT

The disclosure relates to the technical field of air pumps, and particularly relates to an air pump having a reminding function. The air pump includes a pump cylinder provided with a first hollow cavity and a push rod assembly that is pullable. The push rod assembly is movably inserted into the pump cylinder. The air pump further includes an air pressure sensor and a reminding mechanism. The air pressure sensor and the reminding mechanism are both mounted in the pump cylinder or the push rod assembly. The air pressure sensor is connected with the reminding mechanism. An objective of the disclosure is to solve a problem that an existing manual air pump cannot give a reminder when air extraction is completed, and provide an air pump having a reminding function when air extraction is completed.

9 Claims, 9 Drawing Sheets

AIR PUMP HAVING REMINDING FUNCTION

CROSS-REFERENCE TO RELATED APPLICATION

The present disclosure claims priority to Chinese Patent Application No. 202321550887.2, filed on Jun. 16, 2023 and entitled "Air Pump Having Reminding Function", the contents of which are hereby incorporated by reference in its entirety.

TECHNICAL FIELD

The disclosure relates to the technical field of air pumps, and particularly relates to an air pump having a reminding function.

BACKGROUND

An air pump is able to be used to reduce an oxidation speed of a food material and prolong a fresh-keeping period by sucking an air from a food container or a liquor bottle. An existing manual air pump cannot give a reminder when an air extraction is completed, such that an operator is uninformed about an air extraction state. If the air extraction is stopped before the air is completely sucked, a sealed storage effect will be possibly influenced. If the air is completely sucked but the operator is totally unaware of that, the air extraction will continue, which causes labor waste.

SUMMARY

An objective of the disclosure is to solve a problem that an existing manual air pump cannot give a reminder when an air extraction is completed, and provide an air pump having a reminding function when the air extraction is completed, such that an operator may clearly know an air extraction state, and further a better sealed storage effect is able to be achieved.

In order to achieve the objective, a technical solution used by the disclosure is as follows: an air pump having a reminding function includes a pump cylinder provided with a first hollow cavity and a push rod assembly that is pullable, and the push rod assembly is movably inserted into the pump cylinder; and the air pump further includes an air pressure sensor and a reminding mechanism, the air pressure sensor and the reminding mechanism are both mounted in the pump cylinder or the push rod assembly, the air pressure sensor is capable of measuring an air pressure in the first hollow cavity, and the air pressure sensor is connected with the reminding mechanism.

In the above solution, the air pump is connected with a food container or a liquor bottle or another container in a butted manner, and when the air pump works, the push rod assembly is pulled back and forth so as to suck out an air from the container. The air pressure sensor is arranged at a bottom of the push rod assembly, or in the push rod assembly, or in the first hollow cavity of the pump cylinder, so as to monitor the air pressure in the air pump in real time. The air pressure sensor detects that a negative pressure in the container reaches or is lower than a set value, and transmits a signal to the reminding mechanism. The reminding mechanism transmits a reminding signal, and for instance, sounds, or turns on a reminding light, or vibrates, so as to remind a user that the air in the container is completely sucked out, an air extraction is completed, and an air extraction operation may be stopped. The reminding mechanism monitors the air pressure in the air pump, so as to indirectly monitor the air pressure in the container. In this way, the operator may clearly know an air extraction state, and further a better sealed storage effect is able to be achieved.

In some embodiments, an inside of the push rod assembly is provided with a second hollow cavity. The second hollow cavity may be in communication with the first hollow cavity. The air pressure sensor and the reminding mechanism are both mounted in the second hollow cavity. The push rod assembly is set to be hollow, and both the air pressure sensor and the reminding mechanism are mounted in the push rod assembly, such that a mounting space may be reduced. Meanwhile, when the push rod assembly moves downwards, the second hollow cavity is not in communication with the first hollow cavity, and when the push rod assembly moves upwards, the second hollow cavity is in communication with the first hollow cavity, such that the air pressure sensor is able to measure the air pressure in the air pump advantageously.

In some embodiments, the reminding mechanism includes a battery and a reminding device. The reminding device is electrically connected with the battery. The battery supplies power to the reminding device. The reminding device is used as a specific reminding execution apparatus. When the air pressure sensor detects that the negative pressure in the container reaches or is lower than the set value, the reminding device transmits the signal for reminding.

In some embodiments, the reminding device is a sounder. The sounder is connected with the battery. The battery supplies power. When the air pressure sensor detects the negative pressure or the air pressure lower than a set air pressure value, the sounder buzzes, so as to remind the user that the air extraction is completed.

In some embodiments, the reminding device is a vibration motor. The vibration motor is configured to remind the user through a vibration principle. After the air extraction is completed, the vibration motor vibrates to remind the user that the air extraction is no longer required. In some embodiments, the mounting space is able to be reduced with a miniature vibration motor.

In some embodiments, the reminding device is a light emitting diode. The light emitting diode is capable of transmitting light outwards from the pump cylinder or the push rod assembly. The light emitting diode is located in the second hollow cavity and is capable of transmitting light outwards from a top of the push rod assembly. The light emitting diode is capable of emitting light. When the air pressure sensor detects the negative pressure or the air pressure lower than the set air pressure value, the light emitting diode emits light, and the light is transmitted from the push rod assembly, so as to remind the user that the air extraction is completed.

In some embodiments, the air pump further includes a light guide cover. The light guide cover is arranged at the top of the push rod assembly and covers the light emitting diode. The light guide cover is arranged to protect the light emitting diode and make the light emitted by the light emitting diode softer, such that stimulation to the user is able to be reduced. Of course, the light guide cover is not necessary, and the light emitting diode may be directly exposed from the top of the push rod assembly without the light guide cover, such that the user is able to know an air extraction situation by sensing the light when the air extraction is completed.

In some embodiments, the push rod assembly includes a push rod and a handle. The handle is mounted at a top of the push rod and is detachably connected with the push rod. The second hollow cavity is located in the push rod. The push rod is movably inserted into the pump cylinder. The push rod and the pump cylinder are arranged in a sleeved manner, and the push rod is capable of moving back and forth in the pump cylinder, such that an air extraction function is able to be achieved. The handle facilitates holding of the push rod, such that the push rod may move back and forth relative to the pump cylinder advantageously. In some embodiments, the handle is provided with skidproof lines, such that a friction force during contact is able to be increased to facilitate holding of the user.

In some embodiments, an inside of the push rod is provided with a support rod. A bottom of the support rod is connected with the push rod. The air pressure sensor is arranged on the support rod in a penetrating manner. A baffle covers the top of the push rod. The support rod may be arranged to facilitate mounting of the air pressure sensor. In some embodiments, the air pressure sensor is arranged in the support rod, such that the air pressure sensor may be mounted and fixed. The push rod is provided with a plurality of first through holes, and the second hollow cavity is in communication with the first hollow cavity by the first through holes, such that the air pressure sensor may measure the air pressure in the pump cylinder, and further the air pressure in the container may be measured. In this way, in response to low air pressure or negative pressure in the container, the signal may be transmitted to the reminding mechanism so as to achieve the objective of the disclosure, and the air extraction state may be monitored, such that the operator may clearly know the air extraction state, and further the better sealed storage effect is able to be achieved. The baffle is arranged to shield an internal structure of the push rod.

In some embodiments, the air pump further includes a sealing member. An outer side of the push rod is provided with a mounting position. The sealing member is arranged at the mounting position and is in interference fit with the pump cylinder. A gap is provided between the sealing member and the mounting position in a longitudinal direction. The sealing member may be arranged to implement unidirectional sealing when the push rod is pulled. When the push rod is pulled upwards, the sealing member seals the first hollow cavity at the bottom of the push rod, such that the air in the container enters the first hollow cavity of the pump cylinder. When the push rod is pushed downwards, air at the bottom of the push rod passes through a gap between the sealing member and the push rod as well as the pump cylinder, enters a lateral gap between the push rod and the pump cylinder, and then is discharged from a top of the pump cylinder. In some embodiments, the sealing member may be a sealing ring, and the mounting position may be a recess. Through arrangement of the sealing ring, when the push rod is pulled upwards, the sealing ring may move downwards to abut against a lower side of the recess. Meanwhile, the sealing ring is further in interference fit with an inner wall of the pump cylinder, so as to seal the first hollow cavity in the pump cylinder, such that the air enters the first hollow cavity from the container. When the push rod is pushed downwards, the sealing ring moves upwards. The push rod is further provided with a second through hole in communication with an upper side of the recess in the longitudinal direction, such that the air in the first hollow cavity enters the recess along a gap between an outer wall of the lower side of the recess and the pump cylinder, and enters a gap between an outer wall of the push rod and the pump cylinder by the second through hole. The air may enter the second hollow cavity by the first through holes, or may be discharged from an upper end of the pump cylinder, such that the air may be sucked and discharged when the push rod moves back and forth. Within a cognitive range of those skilled in the art, the sealing member may also be of other structures. For instance, the sealing member may also be a sealing cylinder or sealing gasket, such that a unidirectional sealing function when the push rod is pushed and pulled is able to be achieved.

In some embodiments, an outer side of the push rod is further provided with a limiting step configured to prevent the push rod from being separated from the pump cylinder. The top of the pump cylinder is provided with a structure matching the limiting step, such as a retaining eave. When the push rod is pulled upwards and moves up to a limit position, the limiting step is blocked with the retaining eave, and the push rod is prevented from being separated from the pump cylinder, such that the push rod is inserted into the pump cylinder all the time, and the air extraction function is achieved advantageously.

In some embodiments, the air pressure sensor and the reminding mechanism are both mounted in the first hollow cavity of the pump cylinder and located at the bottom of the push rod assembly.

In some embodiments, the air pump further includes an adapter. An inside of the adapter is provided with a one-way valve. The adapter is detachably connected with an end of the pump cylinder. The adapter is used as a connection transition between the container and the air pump. A first end of the adapter is configured to be connected with the container, and a second end of the adapter is configured to be connected with the pump cylinder, such that the air in the container is able to be easily sucked out with the air pump.

The air pump having the reminding function according to the disclosure may be configured to reduce an oxidation speed of a food material and prolong a fresh-keeping period by sucking air from a food container or a liquor bottle. The inside of the air pump is provided with the air pressure sensor to monitor an internal air pressure in real time. When an inner cavity of the air pump reaches a set negative pressure value, the reminding mechanism transmits the reminding signal indicating that the operation is completed.

Figure 1:
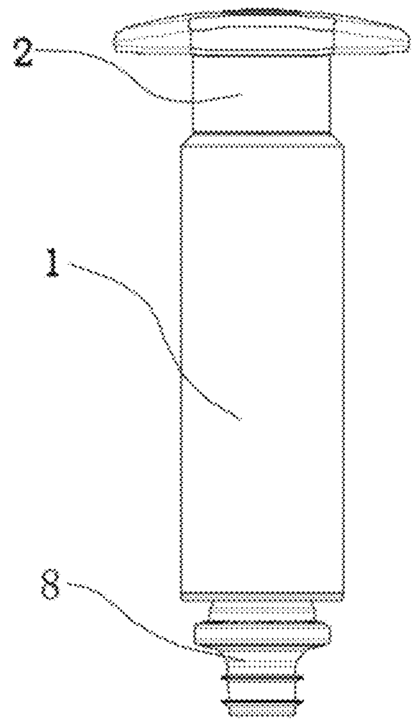
FIG. 1 is a structural diagram of an air pump having a reminding function according to the disclosure.
Figure 2:
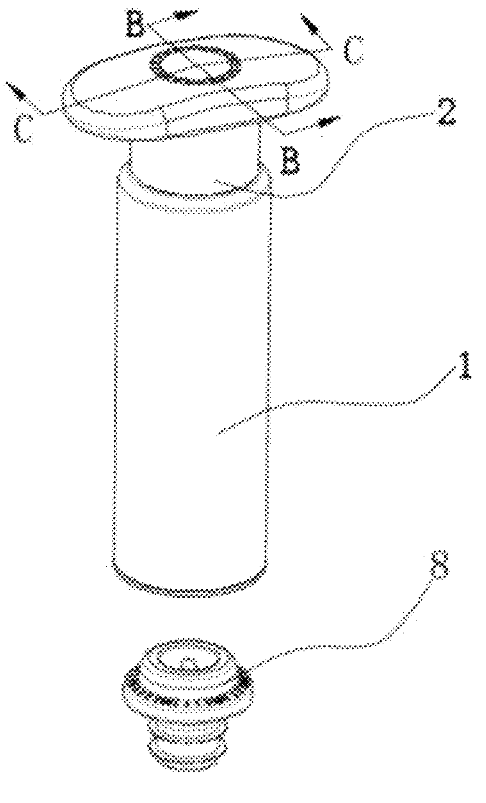
FIG. 2 is an exploded view of an air pump having a reminding function according to the disclosure.
Figure 3:
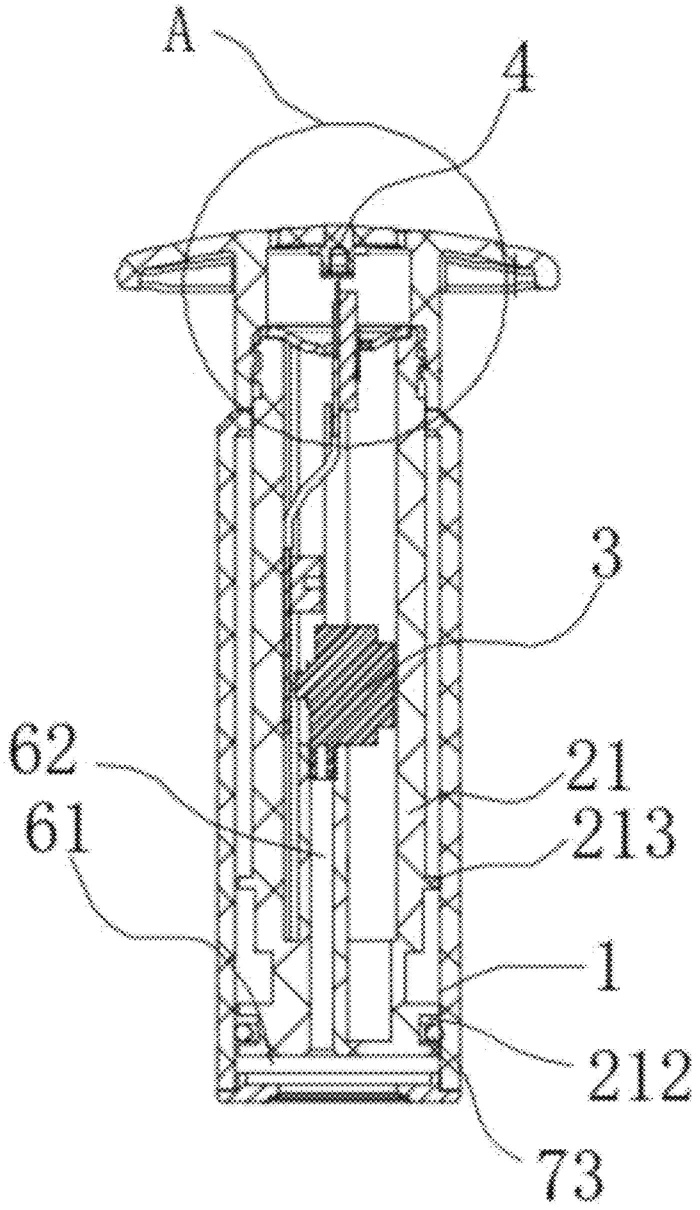
FIG. 3 is a structural diagram of Example 1 of an air pump having a reminding function according to the disclosure.
Figure 4:
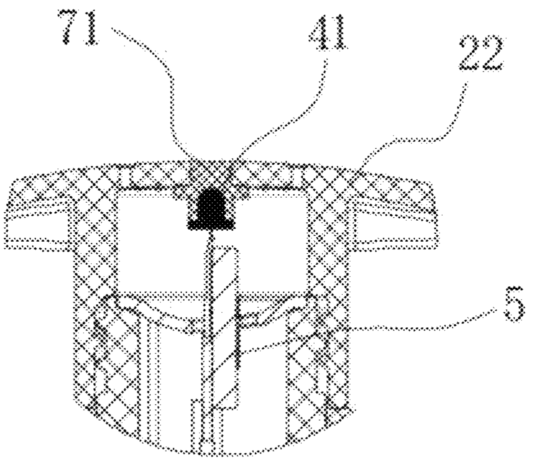
FIG. 4 is an enlarged view of part A in FIG. 3.
Figure 5:
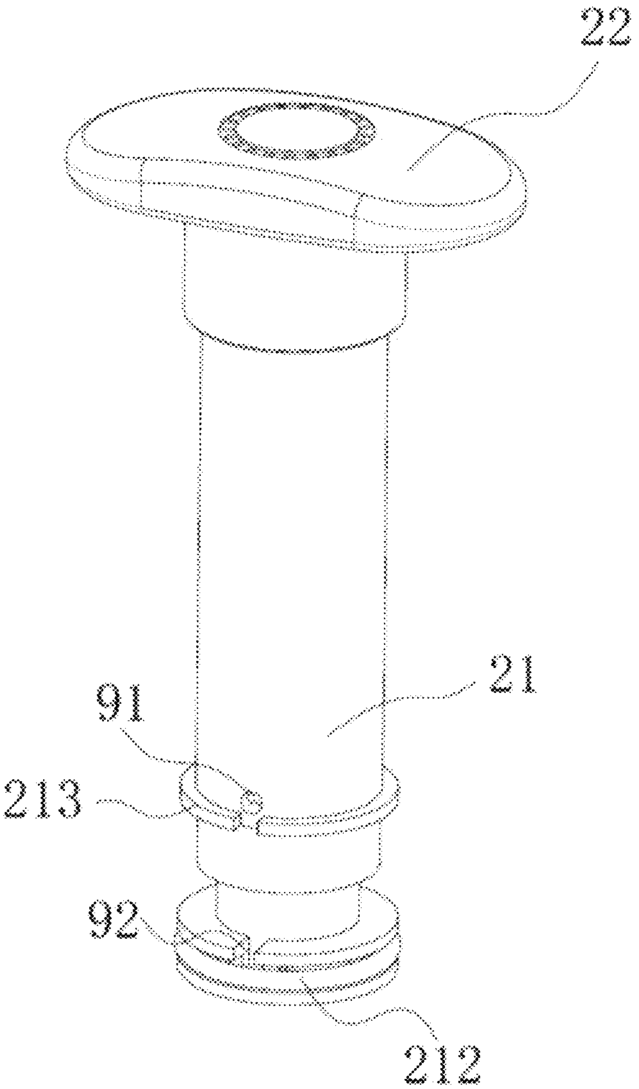
FIG. 5 is an external view of a push rod assembly according to the disclosure.

1, pump cylinder; 11, retaining eave; 2, push rod assembly; 21, push rod; 211, support rod; 212, mounting position; 213, limiting step; 22, handle; 3, air pressure sensor; 31, hose; 4, reminding mechanism; 41, reminding device; 5, battery; 61, first hollow cavity; 62, second hollow cavity; 71, light guide cover; 72, baffle; 73, sealing member; 8, adapter; 81, one-way valve; 91, first through hole; and 92, second through hole.

DETAILED DESCRIPTION OF THE EMBODIMENTS

The accompanying drawings are only for illustrative purposes, and cannot be understood as limiting the patent. In order to better explain examples, some components in the drawings can be omitted, enlarged or reduced, which do not represent a size of an actual product. It can be understood by those skilled in the art that some well-known structures in the drawings and their descriptions may be omitted. Positional relations illustrated in the drawings are only for illustrative purpose and cannot be understood as limiting the patent.

The same or similar reference numerals in the drawings of the examples of the disclosure correspond to the same or similar components. In the description of the disclosure, it should be understood that orientations or positional relations indicated by terms such as “upper”, “lower”, “left”, “right”, “long”, and “short” are based on orientations or positional relations shown in the drawings, which are only for facilitating description of the disclosure and simplification of the description, instead of indicating or implying that a device or an element referred to must have a specific orientation and be constructed and operated in a specific orientation. Therefore, the terms describing the positional relations in the drawings are only for illustrative purposes, and cannot be understood as limiting the patent. Those of ordinary skill in the art can understand specific meanings of the above terms according to specific conditions.

A technical solution of the disclosure will be further specifically described below with reference to specific examples and in conjunction with the accompanying drawings.

Example 1

FIGS. 1-5 show Example 1 of an air pump having a reminding function according to the disclosure. The air pump includes a pump cylinder 1 provided with a first hollow cavity 61 and a push rod assembly 2 provided with a second hollow cavity 62, the push rod assembly is pullable, the first hollow cavity 61 is in communication with the second hollow cavity 62, and further the push rod assembly 2 is inserted into the first hollow cavity 61 of the pump cylinder 1 so as to be movably inserted into the pump cylinder 1. The push rod assembly 2 is pulled back and forth, such that an air extraction function of the air pump is able to be achieved. The air pump further includes an air pressure sensor 3 and a reminding mechanism 4, the air pressure sensor 3 and the reminding mechanism 4 are both mounted in the second hollow cavity 62, and the air pressure sensor 3 is connected with the reminding mechanism. The air pressure sensor 3 is configured to measure an air pressure. The second hollow cavity 62 may be in communication with the first hollow cavity 61, such that the air pressure sensor 3 mounted in the second hollow cavity 62 may measure an air pressure in the first hollow cavity 61. The pump cylinder 1 is connected with a container, and the first hollow cavity 61 is in communication with the container, and the air pressure sensor 3 may indirectly measure the air pressure in the container. In some embodiments, the container may be a food container, or a liquor bottle, or another utensil. The reminding mechanism 4 is configured to transmit a reminding signal, so as to remind a user of an air extraction state.

In some embodiments, the reminding mechanism 4 includes a battery 5 and a reminding device 41. The reminding device 41 is electrically connected with the battery 5. The battery 5 is configured to supply power to the reminding device 41, such that a reminding function of the reminding device 41 is able to be achieved. The reminding device 41 is a light emitting diode. The light emitting diode is located at a top of the second hollow cavity 62 and is capable of transmitting light outwards from a top of the push rod assembly 2. The light emitting diode is capable of emitting light. When the air pressure sensor 3 detects a negative pressure or a pressure lower than a set air pressure value, a signal is transmitted to the light emitting diode, the light emitting diode emits light, and the light is transmitted from the push rod assembly 2, so as to remind the user that an air extraction is completed and an air extraction operation may be stopped. The light emitting diode monitors air pressure in the air pump, so as to indirectly monitor the air pressure in the container. In this way, an operator may clearly know the air extraction state, and further a better sealed storage effect is able to be achieved. The light emitting diode emits bright light, so as to make the reminding function for the user significant. In some embodiments, a color of the bright light may be red, which is more eye-catching, such that the user may clearly see the light at a glance. Of course, a luminous color of the light emitting diode may be adjusted according to needs of the user. Within a cognitive range of those skilled in the art, in some embodiments, the air pressure sensor 3 may also be arranged in the pump cylinder 1.

In some embodiments, the air pump further includes an adapter 8. An inside of the adapter 8 is provided with a one-way valve 81. The adapter 8 is detachably connected with an end of the pump cylinder 1. The adapter 8 is used as a connection transition between the container and the air pump. A first end of the adapter 8 is configured to be connected with the container, and a second end of the adapter is configured to be connected with the pump cylinder 1, such that the air in the container is able to be easily sucked out with the air pump. The adapter 8 may be a separate part, which is mounted at a container opening so as to be connected with the container, or directly placed at a container opening for use, or fixed on the container. In some embodiments, the adapter 8 may be used as a part of the air pump, and is directly and detachably connected with the end of the pump cylinder 1, such that the air pump is able to suck air from the container advantageously.

The first hollow cavity 61 is in communication with the second hollow cavity 62, so an air pressure in the second hollow cavity 62 is equal to an air pressure in the first hollow cavity 61. When the push rod assembly 2 moves upwards, the air pressure in the first hollow cavity 61 decreases to enable part of air in the container to leak into the first hollow cavity 61, such that the container and the first hollow cavity 61 may achieve an air pressure balance. When the push rod assembly 2 moves downwards, pressure in the first hollow cavity 61 increases, the air in the first hollow cavity 61 cannot enter the container and may only be discharged to an outside along an exhaust hole because the inside of the adapter 8 is provided with the one-way valve 81, and the push rod assembly 2 moves back and forth continuously, such that the container finally reaches a certain negative pressure. What is described above is a working principle of the air pump. An inside of the air pump is provided with the air pressure sensor 3 to measure an air pressure value in the container, a principle of which is that the push rod assembly 2 moves upwards in an air extraction process of the air pump, when the air pressure in the first hollow cavity 61 is lower than the air pressure in the container, the air in the container supplements for the air in the first hollow cavity 61, so as to maintain the air pressure balance, when the air pressure sensor 3 mounted in the second hollow cavity 62 detects that the air pressure in the second hollow cavity 62 reaches or is lower than a set negative pressure, which indicates that the air pressure in the container reaches a set value, and the reminding device 41 may transmit the reminding signal. In the example, the light emitting diode is turned on to remind the user that the air extraction is completed.

In some embodiments, the air pump further includes a light guide cover 71. The light guide cover 71 is mounted at the top of the push rod assembly 2 and covers the light emitting diode. The light guide cover 71 is arranged to protect the light emitting diode and make the light emitted by the light emitting diode softer, such that stimulation to the user is able to be reduced. Of course, the light guide cover 71 is not necessary, and the light emitting diode may be directly exposed from the top of the push rod assembly 2 without the light guide cover 71, such that the user is able to know an air extraction situation by sensing the light when the air extraction is completed.

In some embodiments, the push rod assembly 2 includes a push rod 21 and a handle 22. The handle 22 is mounted at a top of the push rod 21 and is detachably connected with the push rod 21. The second hollow cavity 62 is located in the push rod 21. The push rod 21 is movably inserted into the pump cylinder 1. The push rod 21 and the pump cylinder 1 are arranged in a sleeved manner, and the push rod 21 is capable of moving back and forth in the pump cylinder 1, such that an air extraction function is able to be achieved. The handle 22 facilitates holding of the push rod 21, such that the push rod 21 may move back and forth relative to the pump cylinder 1 advantageously. In some embodiments, the handle 22 is provided with skidproof lines, such that a friction force during contact is able to be increased to facilitate holding of the user. Both the air pressure sensor 3 and the reminding mechanism 4 are mounted in the push rod 21.

In some embodiments, an inside of the push rod 21 is provided with a support rod 211. A bottom of the support rod 211 is connected with the push rod 21. The air pressure sensor 3 is arranged on the support rod 211 in a penetrating manner. A baffle 72 covers the top of the push rod 21. The bottom of the support rod 211 is connected with the push rod 21. The air pressure sensor 3 is arranged in the support rod 211 in a penetrating manner. The baffle 72 covers the top of the push rod 21. The support rod 211 may be arranged to facilitate mounting of the air pressure sensor 3. In some embodiments, the air pressure sensor 3 is arranged on the support rod 211, such that the air pressure sensor 3 may be mounted and fixed. The push rod is provided with a plurality of first through holes 91, and the second hollow cavity 62 is in communication with the first hollow cavity 61 by the first through holes 91, such that the air pressure sensor 3 may measure the air pressure in the pump cylinder 1, and further the air pressure in the container may be measured. In this way, in response to low air pressure or negative pressure in the container, the signal may be transmitted to the reminding mechanism 4 so as to achieve the reminding function of the disclosure, and the air extraction state may be monitored, such that the operator may clearly know the air extraction state, and further the better sealed storage effect is able to be achieved. The baffle 72 is arranged to shield an internal structure of the push rod.

In some embodiments, the air pump further includes a sealing member 73. An outer side of the push rod 21 is provided with a mounting position 212. The sealing member 73 is arranged at the mounting position 212 and is in interference fit with the pump cylinder 1. A gap is provided between the sealing member 73 and the mounting position 212 in a longitudinal direction. The sealing member 73 may be arranged to facilitate air extraction and discharge when the push rod 21 moves back and forth.

In some embodiments, the outer side of the push rod 21 is further provided with a limiting step 213 configured to prevent the push rod 21 from being separated from the pump cylinder 1. The top of the pump cylinder 1 is provided with a structure matching the limiting step 213, such as a retaining eave 11. When the push rod 21 is pulled upwards and the push rod 21 moves up to a limit position, the limiting step 213 is blocked with the retaining eave 11, and the push rod 21 is prevented from being separated from the pump cylinder 1, such that the push rod 21 is inserted into the pump cylinder 1 all the time, and the air extraction function is achieved advantageously.

An air extraction principle of the disclosure is as follows:

When the push rod 21 is pulled upwards, the sealing member 73 moves downwards to abut against a lower side of the mounting position 212. Meanwhile, the sealing member 73 is further in interference fit with an inner wall of the pump cylinder 1, so as to seal the first hollow cavity 61 in the pump cylinder 1, such that the air enters the first hollow cavity 61 from the container. When the push rod 21 is pushed downwards, the sealing member 73 moves upwards. The air in the first hollow cavity 61 enters the mounting position 212 along a gap between an outer wall of the lower side of the mounting position 212 and the pump cylinder 1, and enters a gap between an outer wall of the push rod 21 and the pump cylinder by a second through hole 92. The air may enter the second hollow cavity 62 by the first through holes 91, such that the air pressure sensor 3 measures the air pressure. Meanwhile, the air may be discharged from an upper end of the pump cylinder 1, such that the air may be sucked and discharged when the push rod 21 moves back and forth.

Example 2

Figure 6:
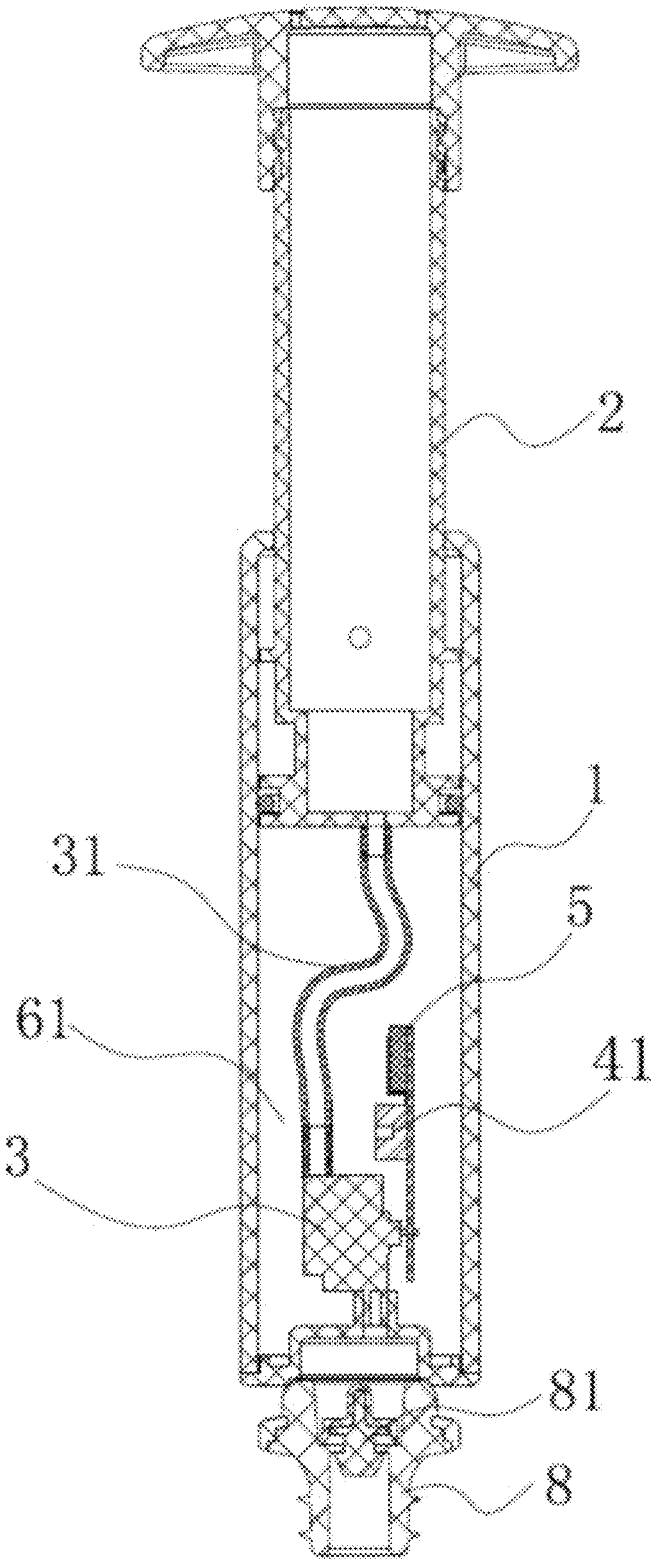
FIG. 6 is a structural diagram of Example 2 of an air pump having a reminding function according to the disclosure.
Figure 7:
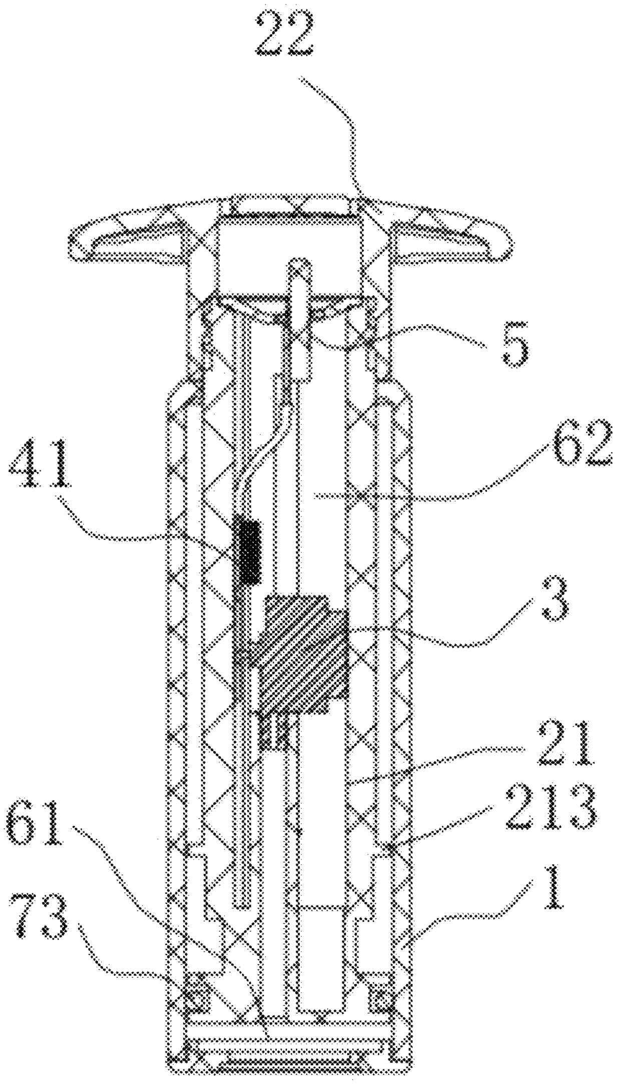
FIG. 7 is a cutaway view of C-C of Example 3 of an air pump having a reminding function according to the disclosure in FIG. 2.
Figure 8:
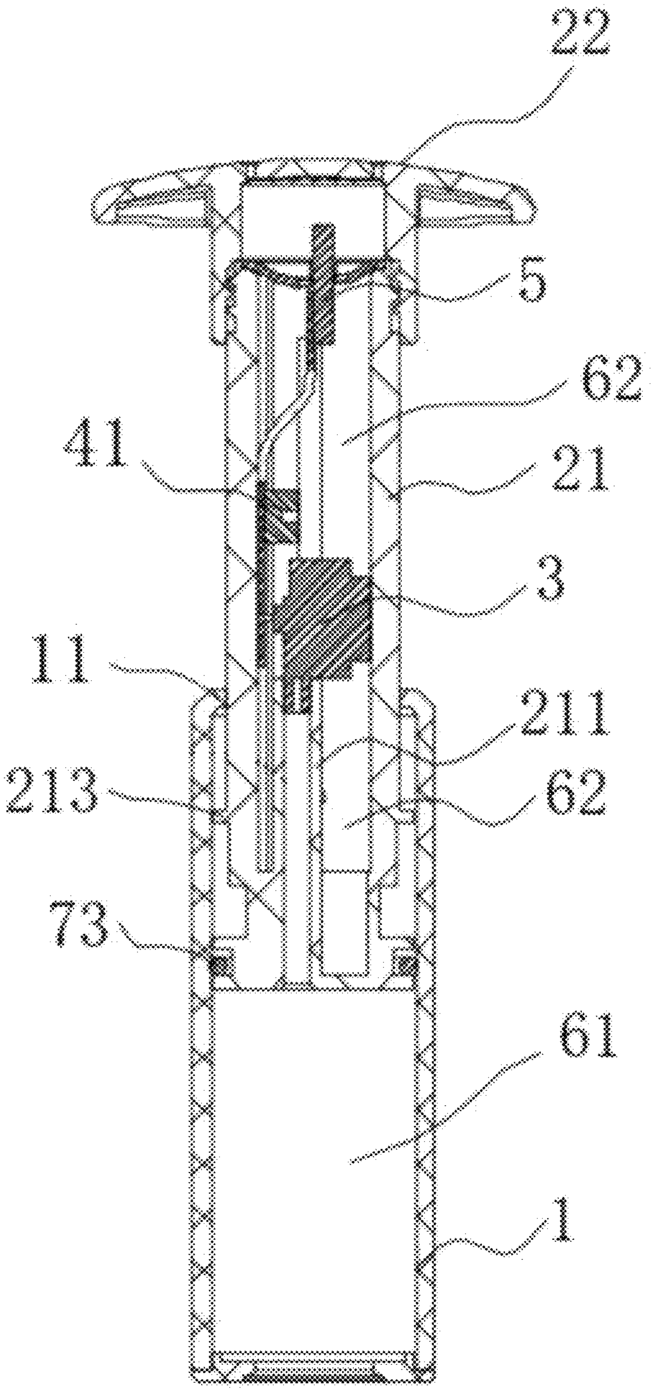
FIG. 8 is a structural diagram of a push rod assembly during pulling in FIG. 7.
Figure 9:
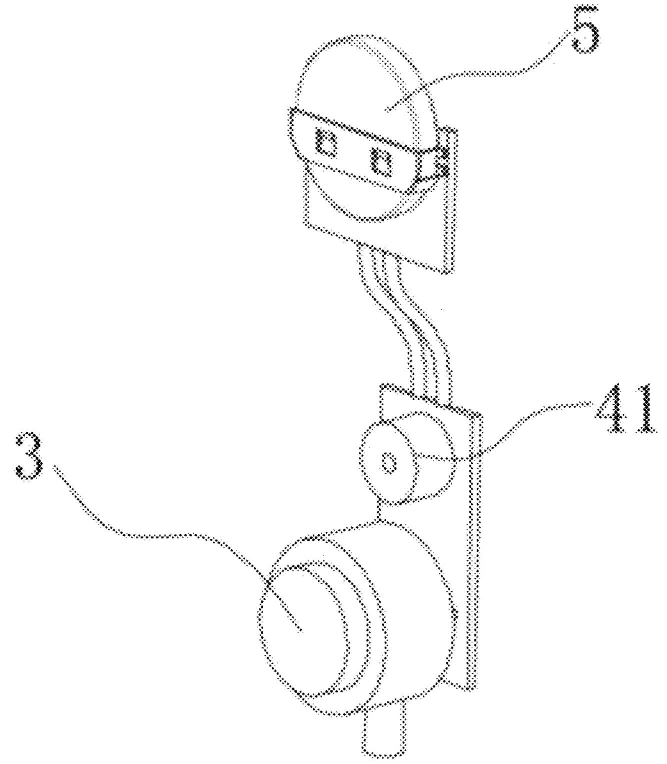
FIG. 9 is a schematic mounting diagram of an air pressure sensor and a reminding mechanism in Example 3 of an air pump having a reminding function.
Figure 10:
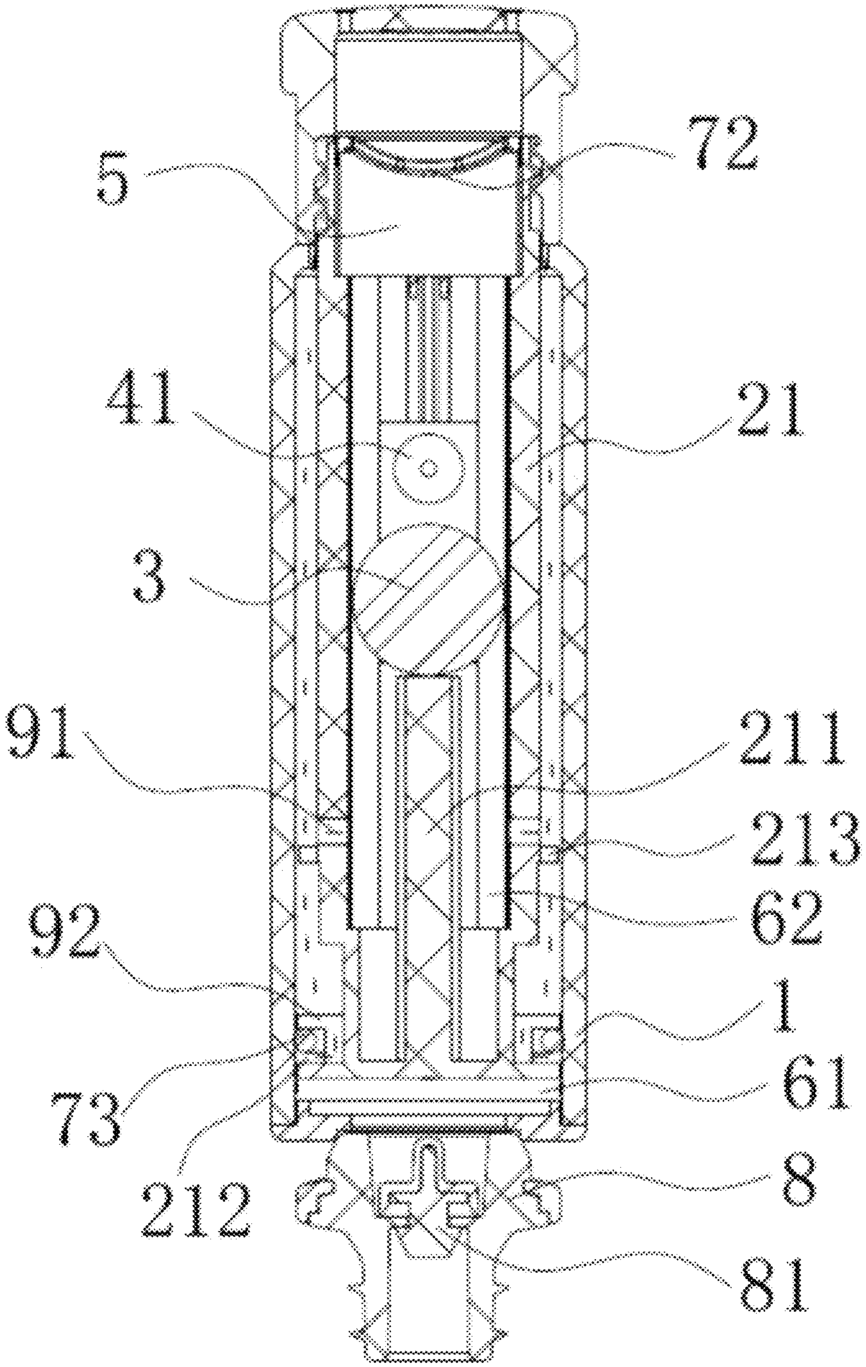
FIG. 10 is a cutaway view of B-B of Example 3 of an air pump having a reminding function according to the disclosure in FIG. 2.

FIG. 6 shows Example 2 of an air pump having a reminding function according to the disclosure. The example is similar to Example 1 and different in that an air pressure sensor 3 and a reminding mechanism 4 are both mounted in a first hollow cavity 61 of a pump cylinder 1 and located at a bottom of a push rod assembly 2.

In some embodiments, the air pressure sensor 3 is further connected with a bottom of the pump cylinder 1, and the bottom of the push rod assembly 2 is provided with a hose 31. A first end of the hose 31 is connected with the push rod assembly 2, and a second end of the hose 31 is connected with the air pressure sensor 3. The reminding mechanism 4 is fixed to the air pressure sensor 3. In the example, the hose 31 may facilitate up-down movement of the push rod assembly 2. The air pressure sensor 3 may be configured to measure both an air pressure in the first hollow cavity 61 and an air pressure between the pump cylinder 1 and an adapter 8.

The push rod assembly 2 is of a hollow or solid structure, and a handle 22 and a push rod 21 that constitute the push rod assembly 2 are integrally formed.

Example 3

FIGS. 7-10 show Example 3 of an air pump having a reminding function according to the disclosure. The example is similar to Example 1 and different in that a reminding device 41 is a sounder. The sounder is mounted in a push rod 21, which may be in a first chamber 621 or a second chamber 622. The sounder is electrically connected with a battery 5. The battery 5 supplies power. When an air pressure sensor 3 detects a negative pressure or a pressure lower than a set air pressure value, a signal is fed back to the sounder to generate a buzz sound, so as to remind a user that an air extraction is completed.

It is very easy to distinguish and detect a reminding signal when buzz sound is used as the reminding signal indicating that the air extraction is completed, and a reminding effect is better.

Example 4

Figure 11:
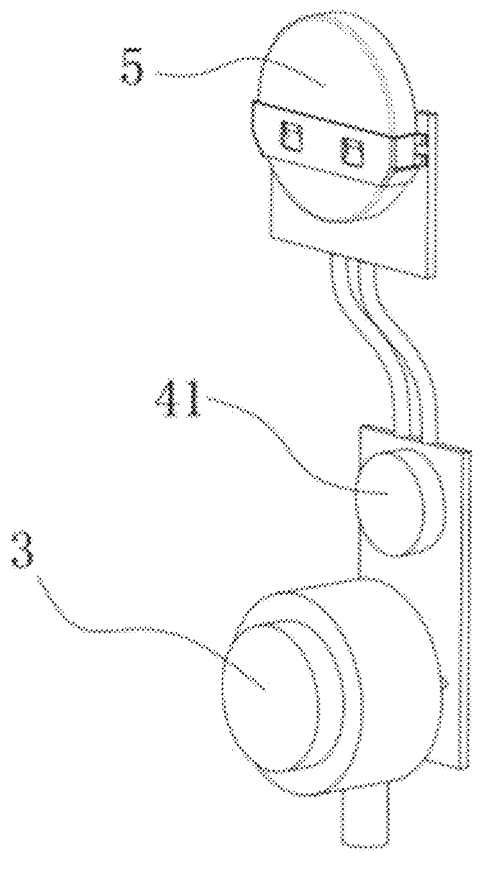
FIG. 11 is a schematic mounting diagram of an air pressure sensor and a reminding mechanism in Example 4 of an air pump having a reminding function.

FIG. 11 shows Example 4 of an air pump having a reminding function according to the disclosure. The example is similar to Example 1 and different in that a reminding device 41 is a vibration motor. The vibration motor is mounted in a push rod 21, which may be in a first chamber 621 or a second chamber 622. The vibration motor is configured to remind the user through a vibration principle. After an air extraction is completed, the vibration motor vibrates to remind a user that the air extraction is no longer required. In some embodiments, a mounting space is able to be reduced with a miniature vibration motor.

Vibration of the vibration motor is used as a reminding signal indicating that the air extraction is completed, which may be transmitted to the push rod 21 and may be easily sensed by the user.

Obviously, the above examples of the disclosure are merely instances given for clearly illustrating the disclosure, and are not intended to limit the embodiments of the disclosure. Those of ordinary skill in the art can make modifications or variations in other forms on the basis of the above description. There are no need and no way to exhaust all the embodiments. Any modifications, equivalent substitutions, improvements, etc. within the spirit and principles of the disclosure are intended to fall within the protection scope of claims of the disclosure.

What is claimed is:

1. An air pump having a reminding function, the air pump comprising; a pump cylinder provided with a first hollow cavity and a push rod assembly that is pullable, wherein the push rod assembly is movably inserted into the pump cylinder, the air pump further comprising an air pressure sensor and a reminding mechanism, the air pressure sensor and the reminding mechanism are both mounted in the pump cylinder or the push rod assembly, the air pressure sensor is capable of measuring an air pressure in the first hollow cavity, and the air pressure sensor is connected with the reminding mechanism; wherein an inside of the push rod assembly is provided with a second hollow cavity, the second hollow cavity is in fluid communication with the first hollow cavity, and the air pressure sensor and the reminding mechanism are both mounted in the second hollow cavity, such that the air pressure sensor mounted in the second hollow cavity is able to fluidly detect the air pressure in the first hollow cavity.

2. The air pump having the reminding function as claimed in claim 1, wherein the reminding mechanism comprises a battery and a reminding device, and the reminding device is electrically connected with the battery.

3. The air pump having the reminding function as claimed in claim 2, wherein the reminding device is a sounder or a vibration motor.

4. The air pump having the reminding function as claimed in claim 2, wherein the reminding device is a light emitting diode, and the light emitting diode is capable of transmitting light outwards from the pump cylinder or the push rod assembly.

5. The air pump having the reminding function as claimed in claim 1, wherein the push rod assembly comprises a push rod and a handle, the handle is mounted at a top of the push rod and is detachably connected with the push rod, the second hollow cavity is located in the push rod, and the push rod is movably inserted into the pump cylinder.

6. The air pump having the reminding function as claimed in claim 5, wherein an inside of the push rod is provided with a support rod, a bottom of the support rod is connected with the push rod, the air pressure sensor is arranged on the support rod in a penetrating manner, and a baffle covers the top of the push rod.

7. The air pump having the reminding function as claimed in claim 6, further comprising a sealing member, wherein an outer side of the push rod is provided with a mounting position, the sealing member is arranged at the mounting position and is in interference fit with the pump cylinder, and a gap is provided between the sealing member and the mounting position in a longitudinal direction.

8. The air pump having the reminding function as claimed in claim 5, wherein an outer side of the push rod is further provided with a limiting step configured to prevent the push rod from being separated from the pump cylinder.

9. The air pump having the reminding function as claimed in claim 1, further comprising an adapter, wherein an inside of the adapter is provided with a one-way valve, and the adapter is detachably connected with an end of the pump cylinder.

* * * * *